July 12, 1932. R. L. SCARLETT 1,867,532
SEED SOWING TOOL OR IMPLEMENT
Filed Jan. 20, 1928   2 Sheets-Sheet 1
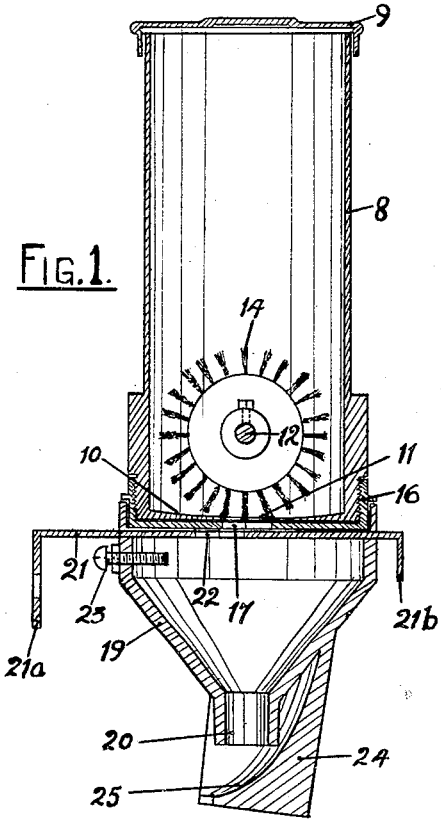
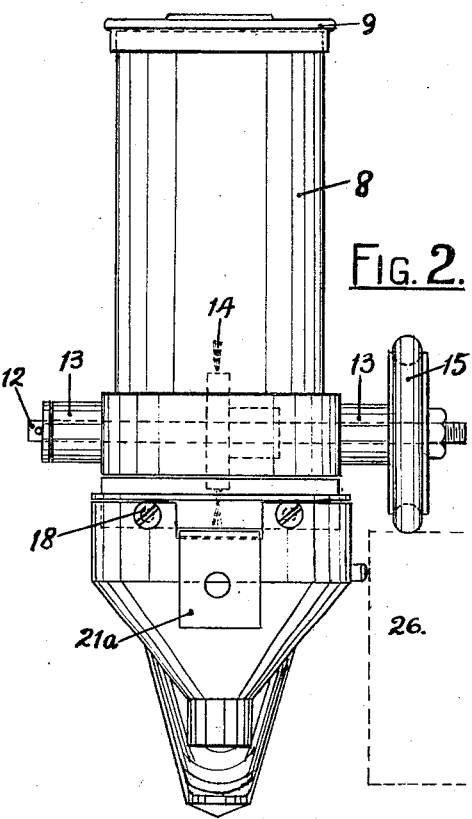
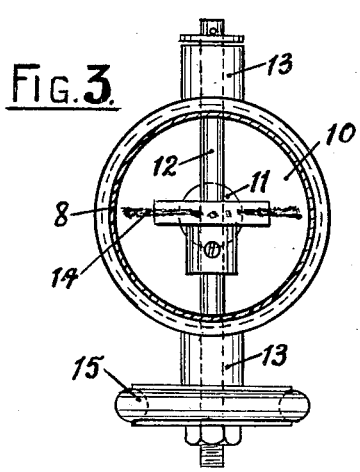
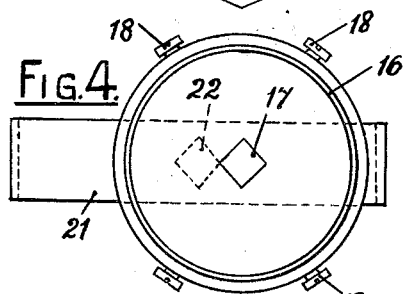
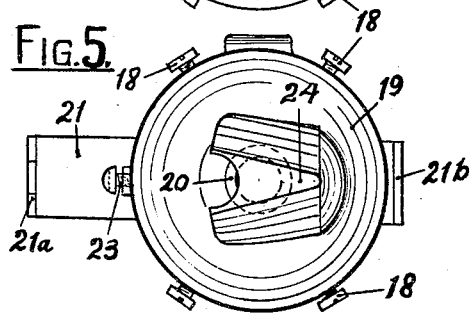
Inventor:
Robert L. Scarlett
by Nathaniel Frucht
his Attorney July 12, 1932.    R. L. SCARLETT    1,867,532
SEED SOWING TOOL OR IMPLEMENT
Filed Jan. 20, 1928    2 Sheets-Sheet 2
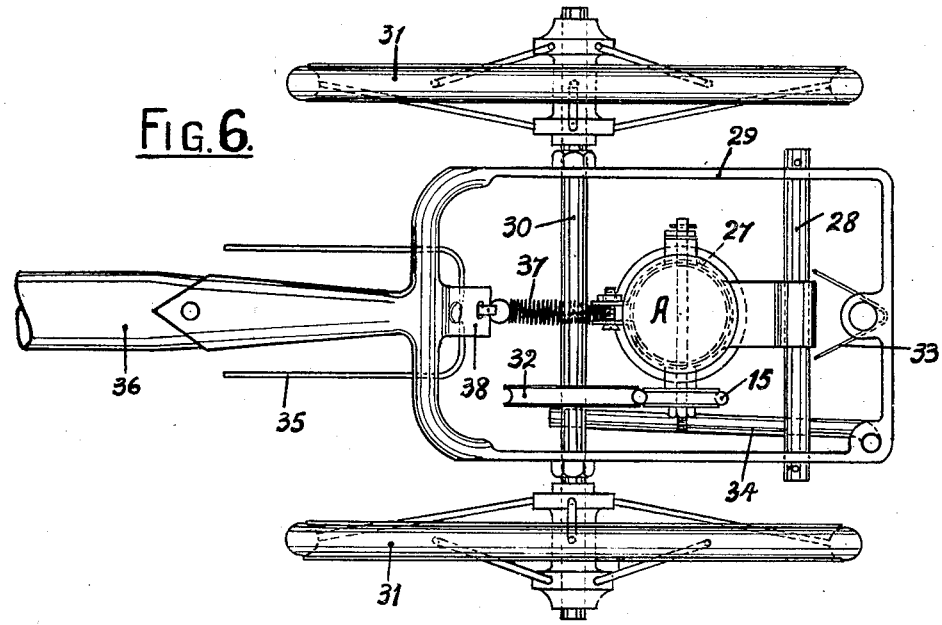
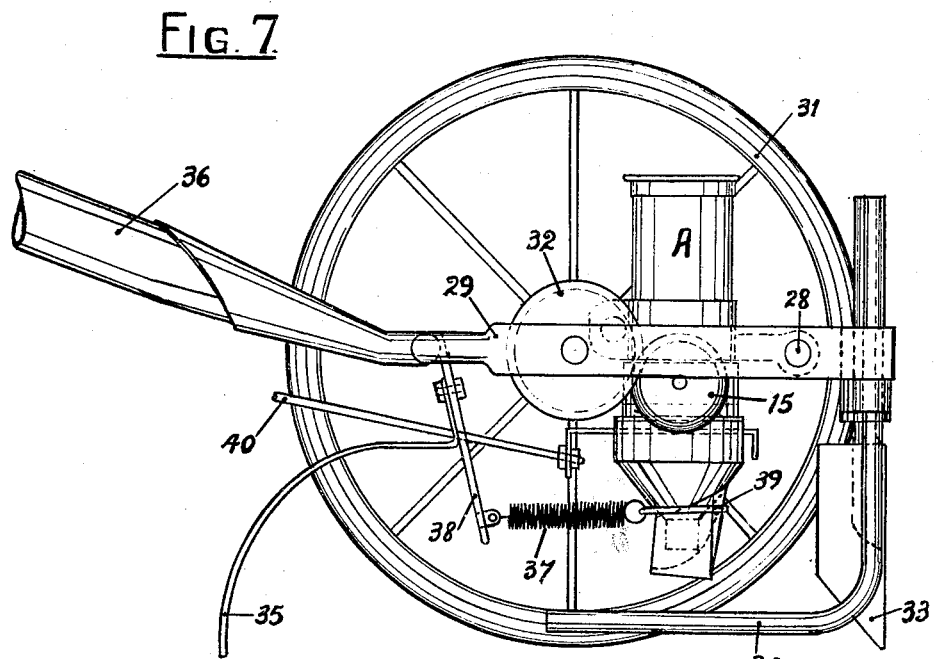

Patented July 12, 1932

1,867,532

UNITED STATES PATENT OFFICE

ROBERT LINDSAY SCARLETT, OF MUSSELBURGH, SCOTLAND

SEED SOWING TOOL OR IMPLEMENT

Application filed January 20, 1928, Serial No. 248,217, and in Great Britain June 1, 1927.

This invention relates to an improved tool or implement for sowing, distributing or depositing seeds, primarily for use in sowing seeds in boxes, frames or beds as commonly used by market gardeners, armateur gardeners and the like, in contradistinction to the broadcast seed sowing implements used in fields and large cultivated areas.

According to the present invention, the tool or implement comprises a box or receptacle which is preferably tubular and has a hinged or removable lid or cap and is closed at the bottom, which is preferably dished or conical, except for a small aperture, which can be regulated by means of an apertured slide according to the size and quantity of the seed to be distributed. The apertured bottom of the seed receptacle discharges into a conical outlet, to the outlet end of which is fixed a V-shaped plough which is also formed with an inclined or curved inner surface to receive the seeds from the conical outlet and deposit them within the furrow or channel formed by the plough.

The tool or implement is preferably provided with a lateral roller or wheel which may be used to guide the implement upon a strip of wood, ruler or other straight-edge or straight or curved guide laid upon the soil in the plant box, bed or frame, whilst the implement is kept in contact with the edge of the wooden strip or ruler, thereby keeping the rows of seeds even. The wheel or roller may drive a rotary brush or other distributor within the seed receptacle so as to eject the seed through the apertured bottom of the receptacle.

The conical outlet end of the implement, together with the regulating slide, may be screwed upon or otherwise detachable from the seed receptacle.

The aperture at the end of the conical outlet does not easily become clogged owing to the aperture being protected by the V-shaped plough.

The implement may also be adapted for sowing seeds in garden beds, market gardens or other larger areas by mounting it upon a wheeled carriage or frame, one of the wheels or the axle of which drives the brush or distributor through contact with the lateral wheel. The wheeled carriage or frame may be provided with a handle or pole to enable it to be propelled from behind.

The brush is preferably mounted upon a transverse shaft so that it revolves in a plane perpendicularly over the aperture in the bottom of the seed receptacle.

In order that the invention may be more clearly understood, reference is hereinafter made to the accompanying drawings whereon:—

Fig. 1 is a vertical sectional view and Fig. 2 an elevation at right angles thereto of the seed sowing implement.

Fig. 3 is a plan view showing the inside of the receptacle.

Fig. 4 is a plan view of the outlet end of the implement detached from the seed receptacle.

Fig. 5 is an inverted plan view of the implement.

Fig. 6 is a plan view and Fig. 7 is a side elevation showing the implement mounted upon a wheeled carriage.

Referring firstly to Figs. 1–5 of the drawings, the implement shown therein comprises a tubular seed receptacle 8 having a removable lid 9 and a dished or conical bottom 10 formed with a central aperture 11. Mounted transversely across the receptacle 8 is a shaft 12 supported in bearings 13. The shaft 12 carries a vertical rotary brush 14, whose bristles extend slightly through the aperture 11. The seed is contained in the receptacle 8 and discharged by the brush 14 through the aperture 11. A roller or wheel 15, which may have a rubber tyre and is mounted on the shaft 12 outside the receptacle, serves for rotating the brush.

Screwed upon or otherwise fixed to the underside of the receptacle 8 is a false bottom 16 which has a central and preferably square or diamond-shaped aperture 17 to register with the aperture 11. The false bottom 16 is secured, such as by screws 18, to a funnel-shaped member 19 which terminates in an outlet 20. Across the top of the funnel-shaped member 19 and immediately beneath the false bottom 16 extends a slide 21 having a central and preferably diamond-shaped aperture 22 adapted, on one position of the slide, to register with the aperture 17. The slide 21 has a downturned end 21a which is adapted to strike against an adjustable stop or screw 23 when the slide aperture 22 registers with the aperture 17. Thus, by varying the setting of the stop 23, the area of the aperture 17 uncovered by the slide aperture 22 can be regulated as desired, according to the size and quantity of the seed to be distributed.

A V-shaped plough 24 is fixed to the funnel-shaped member 19 so that it partially enshrouds the outlet 20 and provides a curved or inclined surface 25 which conducts and guides the seeds into the furrow or channel which is formed by the plough 24 when the implement is in use.

When the implement is to be used for sowing seeds in boxes or frames, a wooden bar or other guide, such as 26 in Fig. 2, is laid upon the soil and the implement is held against the side of the bar with the roller 15 running upon the top of the bar. When the implement has been drawn to one end of the box, the end 21b of the slide 21 strikes against the end of the box, thereby automatically closing the aperture 17 and cutting-off the seed supply. The implement is then brought to the other end of the box to commence sowing a fresh row of seeds and the aperture 17 may be opened by tapping the end 21a of the slide 21 against the end or side of the box.

Figs. 6 and 7 show one adaptation of my invention for sowing seeds over larger areas. In the example shown, the implement designated by the general reference character A, is clamped in a sleeve 27 supported by a bar 28 in a frame 29 which has an axle 30 mounted on wheels 31. Upon the axle 30, which rotates in the frame 29 with the wheels 31, is fixed a pulley or roller 32 which frictionally drives the roller 15 of the implement A. It will of course be readily apparent that the wheeled carriage or frame 29 may be of any other convenient construction adapted to receive and support the implement A and that the roller 15 may be driven from the wheels 31 or wheel axle 30 by any other form of driving mechanism.

The wheeled frame 29 may be provided with a leading or main plough 33 to form the furrow or drill for the reception of the seeds, said main plough being vertically adjustable. A skate or sledge bar 34, which may also be vertically adjustable on the frame 29, may be provided to ride on the soil and thus regulate the depth to which the seed is sown. A rear fork 35 or equivalent device may also be mounted on the frame 29 to turn over the soil and thereby cover the seeds sown by the implement.

The wheeled frame 29 may be conveniently propelled by the provision of a handle or pole 36.

In the example shown in Figs. 6 and 7, the sleeve 27 which carries the implement A is pivotally mounted on the bar 28 and the implement is held in position by a spring 37 in tension between a lug 38 on the frame 29 and a ring 39 or other detachable connection to the implement A, but the latter may be rigidly or otherwise mounted on the frame 29.

When the implement is mounted for manual propulsion as in Figs. 6 and 7, the slide 21 of the implement may be operated by connection to a rod 40 carried up to the end of the handle 36 and adapted to be reciprocated by the provision of any convenient actuating member.

It is to be understood that I do not confine myself to the construction herein described and illustrated, the construction being capable of varied modification within the scope of the invention hereinafter claimed.

Claims:

1. In a seed sowing implement, a seed receptacle having an apertured bottom, a funnel shaped outlet member communicating with said apertured bottom, an adjustable device for controlling the effective size of the aperture, and a plough attached to the outlet member and having a portion positioned beneath the outlet of said outlet member, whereby the seeds passing through the outlet fall on the said plough portion for distribution to the soil.

2. In a seed sowing implement, a seed receptacle having an apertured bottom, a funnel shaped outlet member communicating with said apertured bottom, an adjustable device for controlling the effective size of the aperture, a rotary ejector in the receptacle for ejecting the seed through the apertured bottom, and a plough attached to the outlet member and having a portion positioned beneath the outlet of said outlet member, whereby the seeds passing through the outlet fall on the said plough portion for distribution to the soil.

3. In a seed sowing implement, a seed receptacle having an apertured bottom, a funnel shaped outlet member communicating with said apertured bottom, an adjustable device for controlling the effective size of the aperture, a rotary ejector in the receptacle for intermittent ejection of the seed through the apertured bottom, and a plough attached to the outlet member and having a portion positioned beneath the outlet of said outlet member, whereby the seeds passing through the outlet fall on the said plough portion for distribution to the soil.

4. In a seed sowing implement, a seed receptacle having an apertured bottom, a funnel shaped outlet member communicating with said apertured bottom, an adjustable device for controlling the effective size of the aperture, a brush rotatably mounted in said receptacle and having spaced flexible fingers of a length sufficient to project into the aperture, and a plough attached to the outlet member and having a portion positioned beneath the outlet of said oulet member, whereby the seeds passing through the outlet fall on the said plough portion for distribution to the soil.

5. In a seed sowing implement, a seed receptacle having an apertured bottom, a funnel shaped outlet member communicating with said apertured bottom, an adjustable device for controlling the effective size of the aperture, a shaft extending traversely through said receptacle, a brush device keyed to said shaft and having spaced flexible fingers of a length sufficient to project into the aperture, an operating wheel keyed to said shaft and positioned outside said receptacle, and a plough attached to the outlet member and having a portion positioned beneath the outlet of said outlet member, whereby the seeds passing through the outlet fall on the said plough portion for distribution to the soil.

6. In a seed sowing implement, a movable carriage, a seed receptacle mounted thereon having an outlet at the bottom thereof, means for periodically ejecting seeds through said outlet, means for regulating the quantity of seeds so ejected, a plough attached to the receptacle having a portion positioned beneath the outlet to receive the ejected seeds and spread the same to the soil, a main plough adjustably mountd on the carriage in advance of the receptacle, means mounted on said carriage in rear of the receptacle for turning the soil over the spread seeds, and a device on said carriage adapted to ride on the soil and operatively connected to said ploughs to shift the positions of said ploughs relative to said carriage to regulate the depth of ploughing.

7. In a seed sowing implement, a movable carriage having an axle and wheels secured at the ends of said axle, a seed receptacle mounted on said axle having an outlet at the bottom thereof, means for periodically ejecting seeds through said outlet, means for operating said ejecting means on rotation of said axle, means for regulating the quantity of seeds so ejected, a plough attached to the receptacle having a portion positioned beneath the outlet to receive the ejected seeds and spread the same to the soil, a main plough adjustably mounted on the carriage in advance of the receptacle, means mounted on said carriage in rear of the receptacle for turning the soil over the spread seeds, and a device on said carriage adapted to ride on soil and operatively connected to said ploughs to shift the positions of said ploughs relative to said carriage to regulate the depth of ploughing.

In testimony whereof I affix my signature.

ROBERT LINDSAY SCARLETT.